United States Patent [19]
Nied et al.

[11] Patent Number: 5,290,490
[45] Date of Patent: Mar. 1, 1994

[54] METHOD AND APPARATUS FOR DIFFERENTIALLY HEATING AND THERMOFORMING A POLYMER SHEET

[75] Inventors: Herman F. Nied, Clifton Park; Alexander T. Chen, Schenectady, both of N.Y.

[73] Assignee: General Electric Company, Schenectady, N.Y.

[21] Appl. No.: 911,249

[22] Filed: Jul. 7, 1992

Related U.S. Application Data

[63] Continuation of Ser. No. 545,799, Jun. 29, 1990, abandoned.

[51] Int. Cl.$^5$ .................. B29C 35/14; B29C 51/42
[52] U.S. Cl. .................. 264/26; 264/522; 219/773; 425/174.8 E; 425/160; 425/DIG. 13
[58] Field of Search ......... 264/26, 522, 521, DIG. 65; 425/174.8 E, 160, DIG. 13, 174.8 R; 219/10.41, 10.43, 10.61 R, 10.57, 10.81

[56] References Cited

U.S. PATENT DOCUMENTS

| | | | |
|---|---|---|---|
| 2,468,697 | 4/1949 | Wiley | 264/544 |
| 2,603,741 | 7/1952 | Seifried et al. | 264/25 |
| 2,666,951 | 1/1954 | Grove et al. | 264/544 |
| 2,871,332 | 1/1959 | Northmore et al. | 219/10.81 |
| 3,244,779 | 4/1966 | Levy et al. | 264/548 |
| 3,244,780 | 4/1966 | Levey et al. | 264/522 |
| 3,687,594 | 8/1972 | Medendorp | 425/388 |
| 4,088,718 | 5/1978 | Mulvany, Jr. | 264/25 |
| 4,165,357 | 8/1979 | Vetter | 264/548 |
| 4,234,536 | 11/1980 | Thiel et al. | 264/522 |
| 4,396,816 | 8/1983 | Krishnakumar | 264/26 |
| 4,409,455 | 10/1983 | Belcher et al. | 264/26 |
| 4,420,670 | 12/1983 | Croswell et al. | 425/174.8 E |
| 4,476,364 | 10/1984 | Prevot et al. | 425/174.8 E |
| 4,619,806 | 10/1986 | Gunn | 264/522 |
| 4,842,742 | 6/1989 | Plante | 264/522 |
| 4,937,021 | 6/1990 | Danforth et al. | 264/26 |

FOREIGN PATENT DOCUMENTS

| | | | |
|---|---|---|---|
| 2019295 | 11/1971 | Fed. Rep. of Germany | 264/522 |
| 2134108 | 3/1972 | Fed. Rep. of Germany | 264/522 |
| 3532813 | 3/1987 | Fed. Rep. of Germany | 425/174.4 |
| 62-013322 | 1/1987 | Japan | 219/10.41 |
| 415836 | 2/1972 | U.S.S.R. | 219/10.41 |
| 577208 | 5/1946 | United Kingdom | 219/10.41 |
| 597161 | 1/1948 | United Kingdom | 219/10.57 |
| 652998 | 5/1951 | United Kingdom | 219/10.41 |
| 751068 | 6/1956 | United Kingdom | 264/522 |
| 123881 | 7/1971 | United Kingdom | 264/26 |
| 8310596 | 5/1983 | World Int. Prop. O. | 264/522 |

OTHER PUBLICATIONS

Agmund K. Thorsrud, Sensitizing Polymers for Dielectric Heating, date unknown but before Apr. 1989.
Mulcahy and Berns, Thermoforming Takes On More Engineering Applications, (1990), Plastics Engineering 1, 21.
Grimes, Thermoforming (1981–1982), Modern Plastics Encyclopedia, 405.

*Primary Examiner*—Catherine Timm
*Attorney, Agent, or Firm*—Patrick R. Scanlon; Paul R. Webb, II

[57] ABSTRACT

A method and apparatus for thermoforming 3-dimensional articles of chosen wall thickness dimensions from a polar polymer sheet. The polymer sheet is dielectrically heated, the heating being controlled to impress a predetermined thermal pattern on the sheet. The thermal pattern is selected in accordance with the amount of stretching to which each area of the sheet is subjected during the subsequent work-forming step, the areas subjected to greater stretching being heated to a lower temperature and vice versa. Thus, the stretching action is balanced and results in accurate control of the wall thickness of the final article.

21 Claims, 4 Drawing Sheets

METHOD AND APPARATUS FOR DIFFERENTIALLY HEATING AND THERMOFORMING A POLYMER SHEET

This appliction is a continuation of application Ser. No. 07/545,799, filed Jun. 26, 1990, now abandoned.

BACKGROUND OF THE INVENTION

The present invention is directed in general to thermoforming, and in particular to a method and apparatus for thermoforming articles from a polar polymer sheet wherein the wall thickness of the articles can be accurately controlled to predetermined dimensions.

Thermoforming is a well-known method for fabricating articles such as drinking cups, blister packages, food containers, etc., which uses any suitable drawing or deep drawing technique, such as vacuum forming, pressure forming, plug-assist, mechanical matched die forming or twin sheet hollow part forming or any combination of such techniques. In all cases the sheet material is heated up to the softening temperature called, forming temperature, so that it can be physically worked, i.e. work-formed into the desired articles. For example, some of the forming temperatures of General Electric Company's polymer sheets are about 450° F. to 500° F. for Xenoy ® blend of polycarbonate and polybutylene terephthalate, about 340° F. to 400° F. for Lexan ® polycarbonate, about 520° F. to 560° F. for Ultem ® polyetherimide, and about 280° F. to 340° F. for Cycolac ® acrylonitrile butadiene styrene.

Although the thermoforming process has enjoyed wide success for fabricating shallow depth articles, difficulties are encountered in the fabrication of deep drawn containers or articles having thin walls. It has proven difficult to control the flow of the plastic sheet material as it is work-formed and hence to control the wall thickness of the articles being thermoformed. Precise control of the wall thickness at predetermined areas is desirable in order to provide strength to the article as required, as well as to reduce the cost of the material which is used.

In a typical thermoforming process, the sheet is heated uniformly prior to the work-forming step. During the subsequent work-forming step, the heated sheet is expanded into a die cavity by means of applied differential pressure, e.g. by applying vacuum pressure or positive pressure to one side of the sheet. In the process, portions of the sheet are stretched more than others, resulting, for example, in thin and flimsy bottom corners in a deep drawn container, while other parts of the container will be relatively thick in cross section. Thus, wall ruptures during the work-forming step are fairly common in such a situation.

A number of techniques have been devised to address the aforementioned problem. For example, by using what is designated as a "plug-assist" thermoforming process, a tapered metal plug is employed to effectively prestretch the sheet in selected areas prior to work-forming in the die in an effort to improve the final article wall thickness distribution. Such a process requires relatively complex machinery and extensive process controls to achieve the desired results.

Another known method of controlling the wall thicknesses is by heating certain areas of the sheet preferentially, sometimes referred to as zone heating. This can be done by conductive, convective or radiant heating. The principal heating technique in use today for thermoforming articles, typically uses resistance heaters, ceramic heaters, quartz lamps, or the like. To localize the heating effect, selected areas of the sheet may be screened from the heat source.

The preferential heating techniques discussed above have a number of disadvantages. Where radiant or convective heating is used, the heat is externally and diffusively introduced into the sheet through the sheet surfaces. Since the temperature distribution is transient in nature, it will change with time as the heat diffuses through the plastic sheet surface. This effect precludes the possibility of achieving a sharply defined temperature distribution within the sheet.

In the case of conductive preferential heating, the heating process is not only slow, but the surface of the sheet must be heated to a higher than necessary temperature for the core within to reach the required thermoforming temperature. The overheated surfaces may cause the sheet to sag or prestretch prior to its transfer from the heating station to the thermoforming station and produce unpredictable wall thicknesses in the thermoformed articles.

It should be pointed out that the aforementioned zone heating patterns, and the shapes of the plugs used in a "plug-assist" process, are generally determined by trial and error. As such, they are rarely optimal for a particular plastic sheet, or for a particular heating process. Thus, existing thermoforming techniques do not permit precise control and the wall thickness of the final article cannot be accurately predicted.

SUMMARY OF THE INVENTION

In accordance with the present invention, selected areas of a polar polymer sheet are dielectrically heated to different predetermined temperatures prior to subjecting the sheet to an article forming step, by using dielectric heating apparatus wherein the sheet is positioned between at least one set of mutually facing electrode configurations. The wall thickness of any portion of the article to be formed from the sheet is a function of the temperature attained by the corresponding sheet area throughout the thickness of the sheet, and of the manner in which the sheet area is physically worked during the immediately following article forming step while it retains its attained temperature. The amount of heating applied to different sheet areas may be controlled in a variety of ways, e.g. by applying RF energy for time intervals of different length or by placing different portions of at least one electrode at different distances from the sheet.

Thus, a thermal pattern is impressed on the sheet, the pattern being selected in accordance with the desired wall thickness of corresponding portions of the article to be formed. For example, where a finished article of uniform wall thickness is desired, the sheet areas to be normally subjected to greater stretching during the article forming step are heated to a lower temperature, while the sheet areas to be subjected to less stretching are heated to a higher temperature. As a consequence, uniform stretching of the sheet occurs during the subsequent article forming step, resulting in a finished article of uniform wall thickness.

After the aforementioned thermal pattern is impressed on the sheet, the sheet is placed into an article forming die where it is forced to conform to the die surface to form the shape of the desired article. Subsequently, the article so formed is separated from the remainder of the sheet.

An object of the present invention includes method and apparatus for thermoforming articles from a polar polymer sheet wherein the wall thickness of the articles can be accurately controlled to predetermined dimensions.

Another object of the present invention is to provide an apparatus for dielectrically heating a polar polymer sheet to different predetermined temperatures prior to subjecting the sheet to an article forming step.

Still another object of the present invention is a simple apparatus for a continuous production of thermoformed articles of uniform wall thickness from a polar polymer sheet.

Still another object of the present invention is an apparatus for thermo-forming a polar polymer sheet into 3-dimensional articles having chosen cross-sectional thickness dimensions, said apparatus comprising, dielectric heating means including a set of mutually facing electrodes, said set including at least first and second spaced electrodes; means for positioning said sheet and said electrodes relative to each other such that said first and second electrodes face opposite sheet surfaces; means for applying RF energy to said electrodes to provide dielectric heating in the intermediately positioned sheet; means for controlling said dielectric heating to impress a selected thermal pattern on said sheet wherein different sheet areas are heated to different temperatures in accordance with said chosen thickness dimensions; and means for die-forming said articles from said thermally patterned sheet such that each of said thickness dimensions is determined by the temperature of the originating sheet area and the physical working performed thereon by said die-forming means.

Yet another object of the present invention is a method for dielectrically heating a polar polymer sheet to different predetermined temperatures.

Other objects of the present invention, together with the features and advantages thereof will become apparent from the following detailed description and when read with the accompanying drawings which illustrate exemplary embodiments of the present invention.

DETAILED DESCRIPTION OF THE INVENTION

Figure 1:
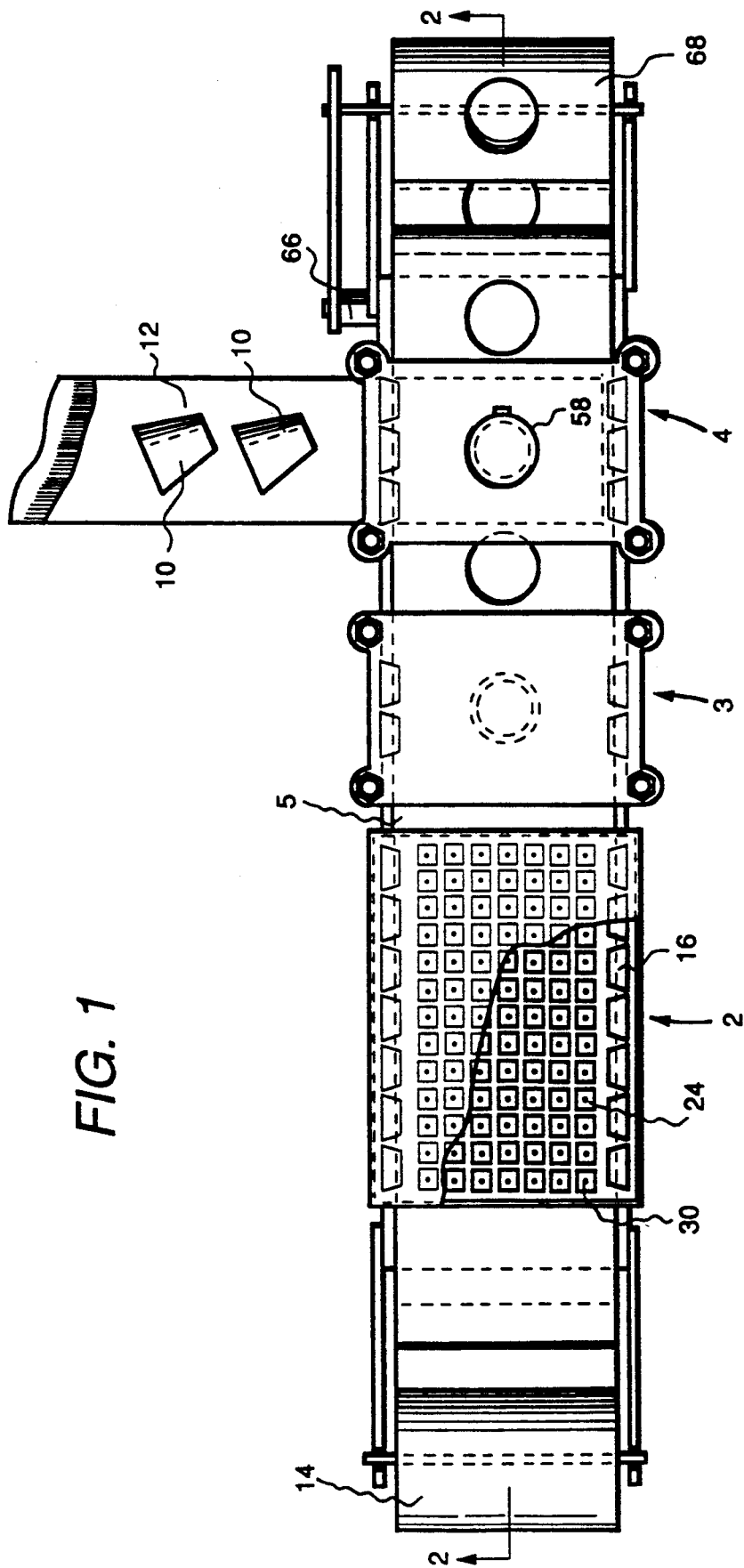
FIG. 1 is a plan view of a preferred embodiment of the invention.
Figure 2:
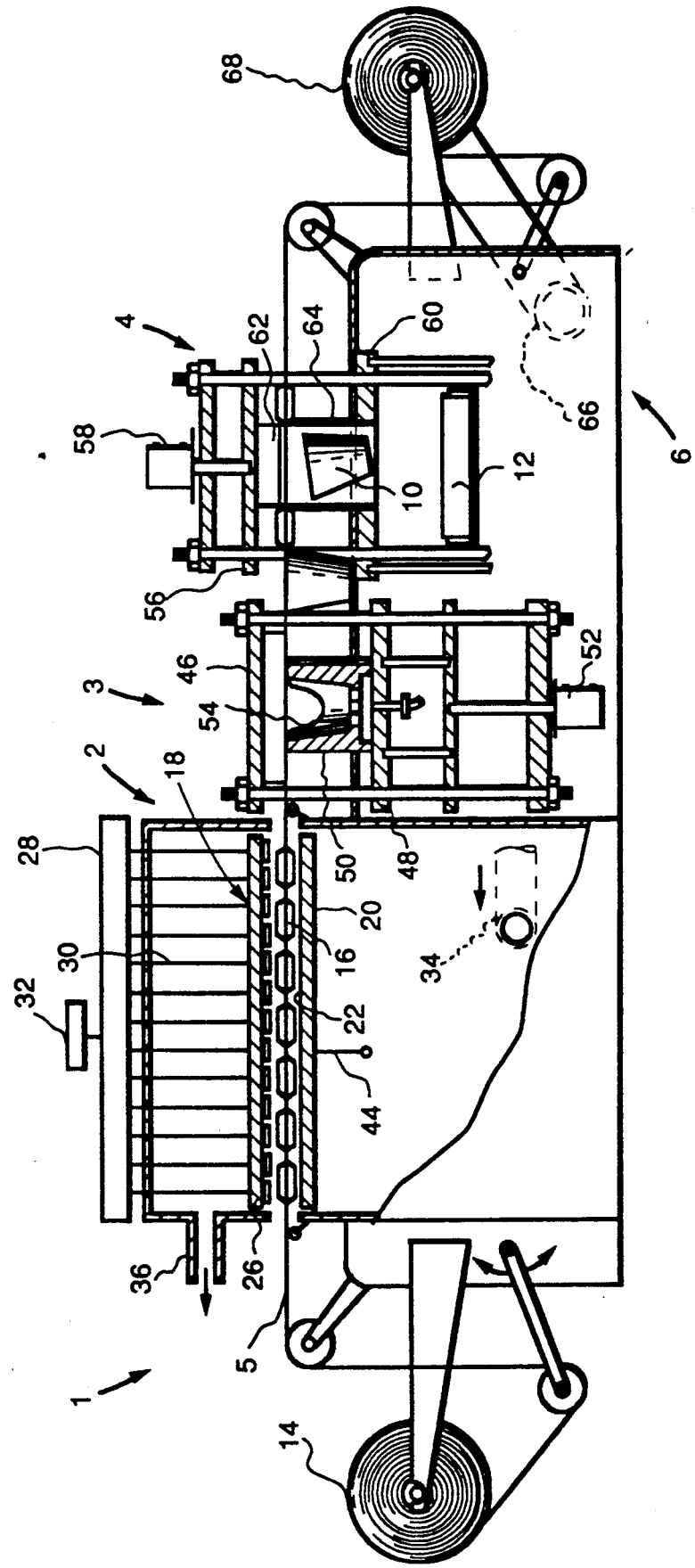
FIG. 2 is a cross-sectional view of the apparatus of FIG. 1 taken along plane 2—2.

Referring now to the drawings, and specifically to FIGS. 1 and 2, the illustrated embodiment of the invention shows a continuous production arrangement for fabricating hollow containers having walls of controlled thickness from a continuous sheet of a polar polymer material. However, it should be noted that present invention is not limited to the arrangement shown and that fabrication may also occur from pre-cut sheets that are hand fed or fed by means of a rotary or a shuttle type mechanism. Thermoforming apparatus, generally indicated by numeral 1, includes a dielectric heater 2 for heating a sheet 5, an article forming press 3 for forming hollow-shaped containers 10 from sheet 5, and an article trimming press 4 in which containers 10 are separated from sheet 5 and are dropped off onto conveyor belt 12 for transfer to a packaging station.

A supply roll 14 dispenses under tension to an RF shielded chamber of dielectric heater 2, located on a main body 6 of thermoforming apparatus 1. Inside a chamber of dielectric heater 2, sheet 5 is held at its edges by two rows of gripping jaws 16, placed along both the edges of the sheet 5. Sheet 5 is thereby positioned between first and second electrodes 18 and 20 respectively. Jaws 16 may be programmed to close while sheet 5 is being heated and remain open the rest of the time.

In the preferred embodiment of the invention illustrated in FIGS. 1 and 2, first and second electrodes 18 and 20 respectively are employed to apply RF energy to sheet 5. The surface of second electrode 20 which faces sheet 5 is coated with lubricious material 22, e.g. Teflon ® material to reduce the friction between it and sheet 5 and to prevent any adhesion between them. Electrode 18 preferably comprises a plurality of discrete conductive electrode segments 24 proximately positioned to one another but spaced sufficiently to be capable of independent energization. Although the invention is not so limited in the illustrated embodiment, all segments lie in a common plane parallel to sheet 5 and are equally spaced from the latter. Further, the segments need not be square-shaped, as shown. Segments 24 are affixed to an insulation member 26 and they receive RF power from an RF power source 28 by way of connectors 30. Depending on the control scheme adopted, segments 24 may be energized either simultaneously, sequentially or intermittently, such control being accomplished by means of a controller 32 which is capable of being programmed manually or via a software program. In order to increase the efficiency of heating and to prevent excessive local heating, hot air may be circulated within the chamber of heater 2, through an intake duct 34 and an exhaust duct 36.

In accordance with the present invention, RF heating is induced in a polar polymer sheet for the direct excitation of the molecules of the sheet by an RF frequency field. The polar polymers can be defined as those polymers that have positively and negatively changed portions present within the polymeric structure. As a result RF heating can be induced in such polymers by direct excitation of these polymer molecules through a rapidly oscillating high frequency electric field supplied by a dielectric heater. The aforestated direct excitation causes these polar polymer molecules to rotate and translate at high speeds. This substantial increase in molecular kinetic energy is seen as increased heat. Non-polymer polymers such polyolefins may not be heated dielectrically because of the dearth of a positively and a negatively changed portions within their molecular structures.

The energy delivered to the polar polymer sheet by an RF field applied by a pair of electrodes on opposite sides of the sheet is given by the expression:

$$P = KfE^2 (\tan\delta)\epsilon \qquad (1)$$

where

P = power delivered to the sheet (W/cm³)
K = 55.6 × 10⁻¹⁴ (constant dependent on units) and
f = field frequency (Hz)
E = local field strength in the sheet material (volts/cm)
tan δ = dielectric loss tangent (property of the sheet material being heated)
ε = dielectric constant (property of the sheet material being treated)

For a given field strength and a fixed frequency, the power density P can be calculated. The local field strength E in the polymer sheet is a function of the applied voltage and the geometry of the electrode. For a constant applied voltage, the local field strength E is approximately inversely proportional to the spacing between the electrodes. The temperature rise T per cm³ in the polymer sheet can then be calculated from:

$$T = Pt/mc \quad (2)$$

where t is time in seconds, m is the mass of the sheet portion being heated, and c is the specific heat of the heated polymer sheet. Since P is proportional to the square of the electric field strength, an effective way of controlling temperature is by increasing or decreasing the field strength E. Further, since E is generally inversely proportional to the mutual spacing of the electrodes, such temperature control can be effected through the aforesaid spacing of the electrodes, or of mutually facing portions thereof.

Figure 3:
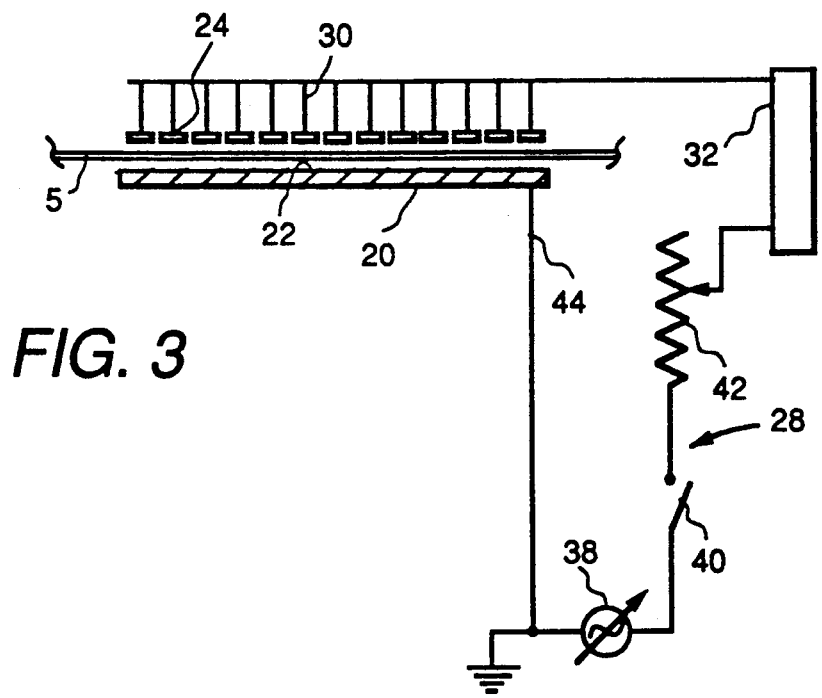
FIG. 3 shows an exemplary RF power control circuit for use with the apparatus of FIGS. 1 and 2.

FIG. 3 shows an exemplary RF power control circuit 28 for the apparatus illustrated in FIGS. 1 and 2. As shown, a variable frequency RF generator 38 coupled to connectors 30 by way of an on-off switch 40 and a rheostat 42 or similar device for varying the applied voltage. The grounded side of generator 38 is connected to second electrode 20 by way of a connector 44. It will be obvious to those skilled in the art that circuit 28 can be implemented in other ways and indeed it is contemplated that it be implemented in a manner capable of being controlled by controller 32.

As shown in FIGS. 1 and 2, a die-forming press 3 is operatively positioned on body 6 of apparatus 1, adjacent to heater 2. Press 3 may consist of a die press further comprising a fixed upper platen 46 and a movable lower platen 48 upon which a thermoforming die 50 is mounted. A mechanical power is supplied to platen 48 by a fluid cylinder 52, in accordance with a predetermined process program.

In the embodiment shown in FIGS. 1 and 2, thermoforming die 50 contains a series of perforations 54 at its bottom through which a vacuum is applied by way of a vacuum pump.

An article trimming station 4, adjacent to article forming press 3, is operatively positioned on main body 6 of thermoforming apparatus 1. Station 4 may consist of a die press which comprises a movable upper platen 56, powered by fluid cylinder 58 and positioned above sheet 5 and a movable lower platen 60 positioned below sheet 5. A pair of mating trimming dies 62 and 64 are mounted on platens 56 and 60, respectively.

In operation, a desired portion of sheet 5 from supply roll 14 is fed into dielectric heater 2 by the pulling action supplied by motor 66 to waste roller 68. Jaws 16 then clamp sheet 5 to stretch it taut and heating is initiated to impress a predetermined thermal pattern on the sheet portion in the heater. It is contemplated that sheet 5 could be also heated by a plurality of sequentially positioned first and second electrodes for progressive heating or simultaneous heating of larger areas of sheet 5. It is further contemplated that sheet 5 could be held stationary and first electrode 18 and second electrode 20 are moved to position sheet 5 therebetween. Sheet 5 could be also fed into dielectric heater 2 in a direction other than the horizontal direction shown in FIG. 1.

Polar polymer sheet 5 could be a mono or a multi layered sheet. It is contemplated that it could also be a composite material, or a nonpolar polymer material impregnated or blended with polar material such that the resulting composite behaves like a polar material.

As shown in FIG. 3, segments 24 are energized from RF generator 38. Controller 32 is capable of varying either the RF frequency, the RF voltage, or the interval during which the RF power is applied to each segment 24. In the latter case, either the initiation or termination of power application may be varied for the respective segments. Controller 32 is programmed to impress the predetermined thermal pattern on the sheet portion in the heater.

Referring to FIG. 2, it is contemplated that, prior to dielectric heating, sheet 5 may be preheated to a uniform intermediate temperature by recirculating hot air supplied via duct 34 and exhaust through duct 36. Such preheating reduces the duration of the overall heating cycle.

Once sheet 5 has the desired thermal pattern impressed on it a suitably desired control signal is sent to jaws 16 to release the edges of the sheet. Similarly, a signal is sent to motor 66 to move sheet 5 such that the sheet area carrying the thermal pattern moves to die-forming press 3 for performing a die-forming step. Jaws 16 sealably hold sheet 5 against the face of die 50. A further control signal actuates fluid cylinder 52 to move platen 48 and die 50 up, to trap sheet 5 between die 50 and fixed platen 46. A differential gas pressure provided by vacuum is then applied through perforations 54 to die 50 to force the trapped area of sheet 5 to stretch and conform to the shape of the cavity. The thermal pattern on sheet 5 is selected such that the area of sheet 5 exposed to greater stretching, e.g., the bottom corners are heated to a lower temperature than the sheet areas subjected to minimal stretching, thereby providing for a substantially uniform stretching action throughout and hence produces a finished article with substantially uniform wall thickness where desired.

In the example under consideration, the shaped article 10, in the form of a cup, remains attached to sheet 5 after it is formed. Upon command, movable platen 48 moves down to release article 10 and allows sheet 5 to move to trimming station 4. Suitable control signals actuate movable platens 60 and 56 to move trimming dies 62 and 64, respectively against each other in order to trim article 10 from sheet 5. The trimmed article then falls onto conveyor belt 12 for transfer to a packaging station. Further control signals reverse the motions of the trimming dies and move sheet 5 along to be rolled onto waste roller 68.

Figure 4:
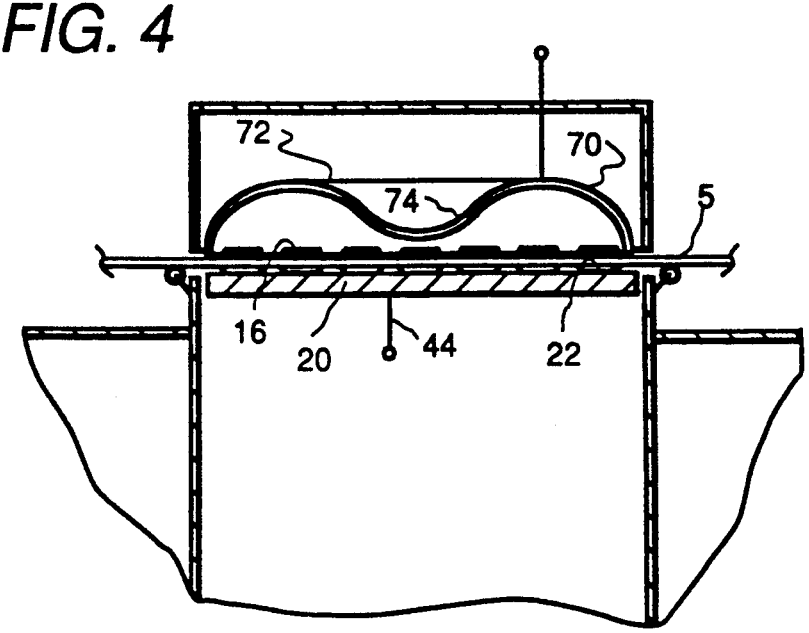
FIG. 4 illustrates another embodiment of the present invention for carrying out preferential dielectric heating.

FIG. 4 illustrates another embodiment of the present invention showing the controlling means used for dielectrically heating sheet 5 in a selected thermal pattern. The heat controlling means are provided by first electrode 70 having a continuously contoured shape for varying the spacing between electrode 70 and sheet 5. The contour on said first electrode is made in conformity with a desired thermal pattern being impressed on sheet 5.

In operation of the embodiment of the present invention, as shown in FIG. 4, sheet 5 is dielectrically heated by electrode 70 which forms a continuous contoured surface in which different portions of the electrode, e.g. portions 72 and 74, are stationed at a different spacing from sheet 5. Thus, sheet 5 under surface portion 74, is heated less than the area under surface portion 72. Thus, a thermal pattern determined by the contour of electrode 70 is impressed on sheet 5. Accordingly, the contours of electrode 70 provide the control of the dielectrically applied heat. If a different thermal pattern is desired on sheet 5, electrode 70 must either be exchanged or reconfigured.

Figure 5:
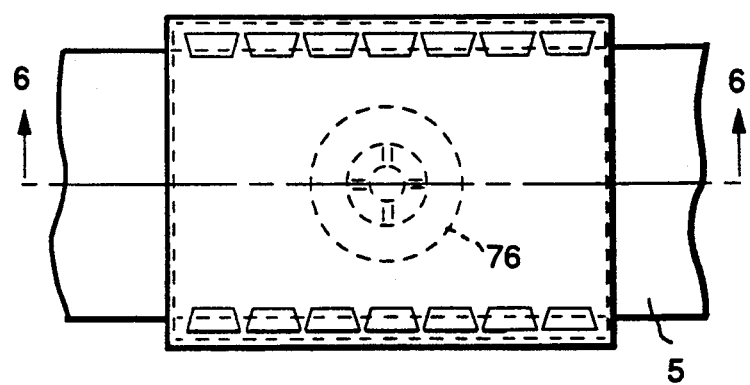
FIG. 5 illustrates a further embodiment of the present invention for carrying out preferential dielectric heating.
Figure 6:
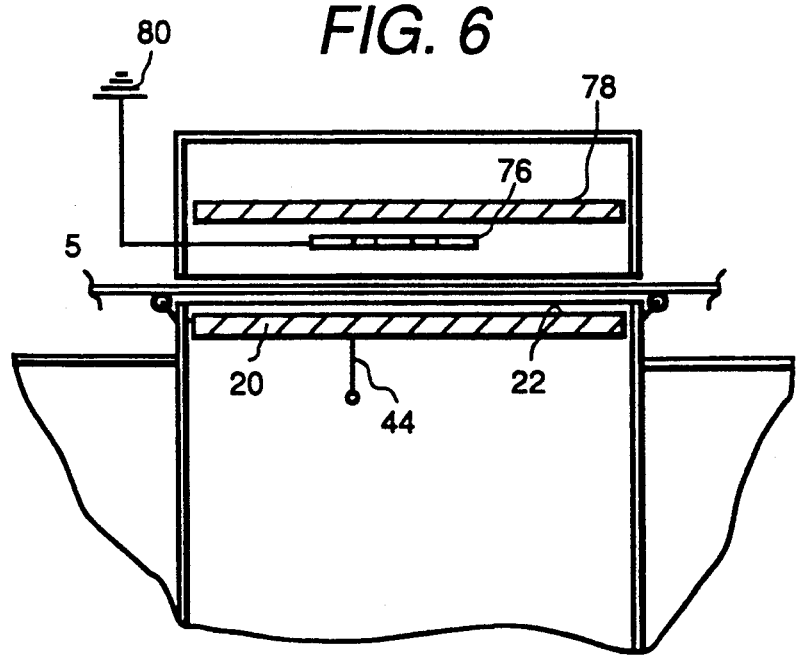
FIG. 6 is a cross-sectional view of the apparatus of FIG. 5 taken along plane 6—6.

FIGS. 5 and 6 illustrate yet another embodiment of the present invention showing the controlling means used for dielectrically heating sheet 5 in a selected thermal pattern. The heat controlling means are provided by a grounded metallic shield 76 interposed between a preferably planar first electrode 78 and sheet 5. Shield 76 is made of a wire mesh screen, or a thin metal plate. Shield 76 grounded to ground 80, is shaped in conformity with the desired thermal pattern being impressed on sheet 5.

In the embodiment of the invention illustrated in FIGS. 5 and 6, a grounded metal mesh screen shield 76 is used to impress a thermal pattern on sheet 5. When RF power is applied to first electrode 78 and second electrode 20, the areas on sheet 5 that are screened by the shield from RF energy are heated less than the areas directly exposed to RF energy. Thus, a desired thermal pattern is impressed on sheet 5. It will be understood that the shape of shield 76 has to be changed if a different thermal pattern is desired.

The method and apparatus described above lend themselves to different variations within the preview of the present invention. For example, air under pressure may be used instead of a vacuum to force the trapped sheet area into the cavity. Alternatively, in lieu of differential air pressure, or in conjunction with it, a matched metal die set may be used wherein a core portion forces the trapped sheet area into a cavity portion to produce the desired shape of the article. A hollow-shaped article may be formed by the aforementioned method when air pressure is applied between twin dielectrically heated sheets pinched between a split female die whereby the twin sheets are forced to conform to the die shape. By impressing a selected thermal pattern on the dielectrically heated twin sheets, a hollow-shaped article having a uniform wall is produced. The aforementioned process is further enhanced by applying vacuum from the die side.

It will be understood that the foregoing description and drawings are only illustrative of the present invention and it is not intended that the invention be limited thereto. Numerous variations, changes, substitutions, and modifications will now occur to those skilled in the art which come within the scope of the present invention without departing from the spirit and scope thereof. Accordingly, it is intended that the invention be limited only by the scope of the appended claims.

What is claimed is:

1. A method for dielectrically heating a sheet of polar polymer material, comprising the steps of:
   placing said sheet between first and second spaced electrodes, wherein at least said first electrode comprises a plurality of discrete electrode segments proximately positioned to each other, and
   dielectrically heating said sheet by applying RF energy to said first and second electrodes;
   varying the RF energy applied to respective ones of said plurality of discrete electrode segments so that different segments can have different applications of RF energy to impress a selected thermal pattern on said sheet.

2. The method according to claim 1, wherein said step of varying the RF energy comprises applying RF energy to respective ones of said segments for time intervals of different length so as to attain said selected thermal pattern on said sheet.

3. The method according to claim 1, wherein said step of varying the RF energy comprises applying RF energy to respective ones of said segments at different voltages so as to attain said selected thermal pattern on said sheet.

4. The method according to claim 1, wherein said step of varying the RF energy comprises applying RF energy to respective ones of said segments at different frequencies so as to attain said selected thermal pattern on said sheet.

5. A method for thermoforming a sheet of polar polymer material into articles having chosen cross-sectional thickness dimensions, said method comprising the steps of:
   positioning said sheet between a first electrode having a plurality of discrete electrode segments and a second electrode such that said electrodes face opposite sheet surfaces;
   dielectrically heating said sheet by energizing said electrodes with a high frequency power source;
   varying the high frequency power applied to respective ones of said plurality of discrete electrode segments so that different segments can have different applications of high frequency power to impress a selected thermal pattern on said sheet; and
   die-forming said articles from said thermally patterned sheet such that each of said thickness dimensions is determined by the temperature of the originating sheet area and the physical working performed thereon during the die-forming step.

6. The method according to claim 5, wherein said step of varying the high frequency power comprises applying high frequency power to respective ones of said segments for time intervals of different length so as to attain said selected thermal pattern.

7. The method according to claim 5, wherein said step of varying the high frequency power comprises applying high frequency power to respective ones of said segments at different voltages so as to attain said selected thermal pattern.

8. The method according to claim 5, wherein said step of varying the high frequency power comprises applying high frequency power to respective ones of said segments at different frequencies so as to attain said selected thermal pattern.

9. Apparatus for dielectrically heating an article, said apparatus comprising:
   a first electrode, said first electrode comprising a plurality of discrete electrode segments;
   a second electrode spaced from said first electrode to receive an article to be heated therebetween;
   a source of RF energy connected to said first and second electrodes; and
   control means for varying the RF energy applied to respective ones of said plurality of discrete electrode segments so that different segments can have different applications of RF energy to impress a selected thermal pattern on said article.

10. Apparatus according to claim 9, wherein said control means includes means for varying the length of the time interval during which RF energy is applied to respective ones of said segments so that different segments can have RF energy applied for different time intervals, the different time intervals causing said selected thermal pattern.

11. Apparatus according to claim 9, wherein said control means includes means for varying the voltage at which Rf energy is applied to respective ones of said segments so that different segments can have different voltages, the different voltages causing said selected thermal pattern.

12. Apparatus according to claim 9, wherein said control means includes means for varying the frequency at which RF energy is applied to respective ones of said segments so that different segments can have different frequencies, the different frequencies causing said selected thermal pattern.

13. Apparatus according to claim 9, wherein said second electrode includes a lubricious surface.

14. Apparatus for forming a polar polymer sheet into articles having chosen cross-sectional dimensions, said apparatus comprising:
   a first electrode, said first electrode comprising a plurality of discrete electrode segments;
   a second electrode spaced from said first electrode;
   means for positioning a polar polymer sheet between said first and second electrodes;
   a source of RF energy connected to said first and second electrodes;
   control means for varying the RF energy applied to respective ones of said plurality of discrete electrode segments so that different segments can have different applications of RF energy to impress a selected thermal pattern on said sheet; and
   means for die-forming articles from said thermally patterned sheet such that each of said thickness dimensions is determined by the temperature of the originating sheet area and the physical working performed thereon by said die-forming means.

15. Apparatus according to claim 14, wherein said control means includes means for varying the length of the time interval during which RF energy is applied to respective ones of said segments so that different segments can have RF energy applied for different time intervals, the different time intervals causing said selected thermal pattern.

16. Apparatus according to claim 14, wherein said control means includes means for varying the voltage at which RF energy is applied to respective ones of said segments so that different segments can have different voltages, the different voltages causing said selected thermal pattern.

17. Apparatus according to claim 14, wherein said control means includes means for varying the frequency at which RF energy is applied to respective ones of said segments so that different segments can have different frequencies, the different frequencies causing said selected thermal pattern.

18. Apparatus according to claim 14, wherein said positioning means includes means for moving said sheet past said electrodes;
   said second electrode including a lubricious surface facing said sheet to diminish friction or adhesion with respect to said sheet.

19. Apparatus according to claim 14, wherein said die-forming means comprises:
   a die including at least one die surface shaped to provide the desired configuration of said articles;
   gripping means for sealably holding said sheet against said die; and
   means for applying differential gas pressure to opposite surfaces of said sheet to force said sheet to conform to said die surface.

20. Apparatus according to claim 19, wherein said die surface is perforated, said means for applying differential gas pressure comprising means for applying vacuum pressure through said perforated die surface to draw said sheet into contact therewith.

21. Apparatus according to claim 19, wherein said means for applying differential gas pressure comprises means for applying positive pressure against the sheet surface remote from said die surface.

* * * * *